(12) United States Patent  (10) Patent No.: US 6,662,370 B1
Buchanan, Jr.  (45) Date of Patent: Dec. 16, 2003

(54) NIGHT VISION DEVICE HELMET MOUNT

(75) Inventor: Harrison Lewis Buchanan, Jr., Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 104 days.

(21) Appl. No.: 10/116,035

(22) Filed: Apr. 5, 2002

Related U.S. Application Data

(60) Provisional application No. 60/347,377, filed on Jan. 11, 2002.

(51) Int. Cl.$^7$ ................................................. A42B 3/00
(52) U.S. Cl. ................................. 2/6.2; 2/422; 359/409; 359/815
(58) Field of Search ............................... 2/6.2, 422, 6.3; 359/409, 815

(56) References Cited

U.S. PATENT DOCUMENTS

| 5,265,276 A | * | 11/1993 | Kimberly, Jr. ................... | 2/6.2 |
| 5,367,402 A | * | 11/1994 | Holmes et al. .................. | 2/6.2 |
| 5,506,730 A | * | 4/1996 | Morley et al. ............... | 359/815 |
| 5,542,627 A | * | 8/1996 | Crenshaw et al. ............... | 2/6.3 |
| 5,623,730 A | * | 4/1997 | Baudou et al. .................. | 2/6.2 |

* cited by examiner

Primary Examiner—Rodney M. Lindsey

(57) ABSTRACT

A helmet plate for interfacing between a helmet having a frontally located obstruction and a mount adjustment assembly for a night vision device. The helmet plate is comprised of a support portion having a band and a cavity for overlying the obstruction and an integral power pack housing. The integral power pack housing is disposed in relation to the support portion at such height, depth and angular position to render a night vision device attached to a mount adjustment assembly which is secured to the integral power pack housing in correct viewing position.

18 Claims, 13 Drawing Sheets

HEAD TILTED BACK

HEAD NORMAL

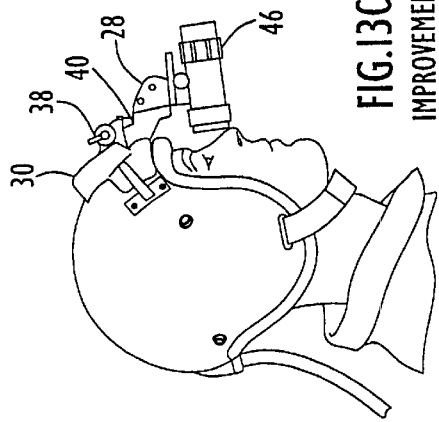
FIG.13C
IMPROVEMENT
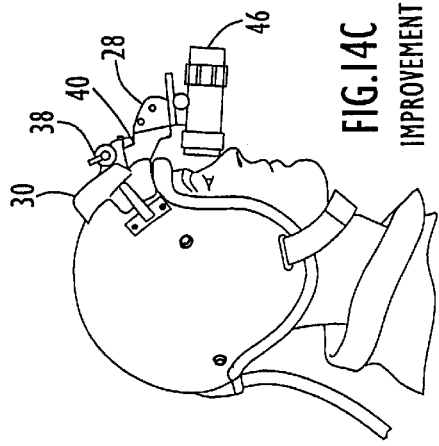
FIG.14C
IMPROVEMENT
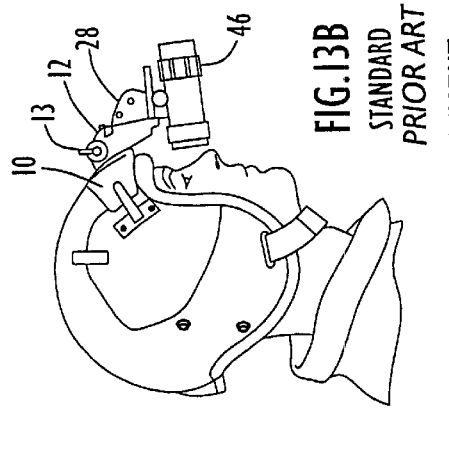
FIG.13B
STANDARD
*PRIOR ART*
FAR UPWARD TILT ADJUSTMENT
FIG.14B
STANDARD
*PRIOR ART*
FAR DOWNWARD TILT ADJUSTMENT
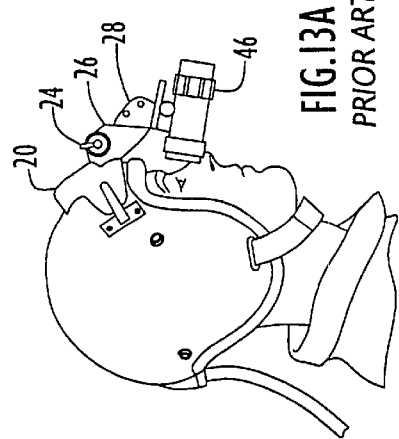
FIG.13A
*PRIOR ART*
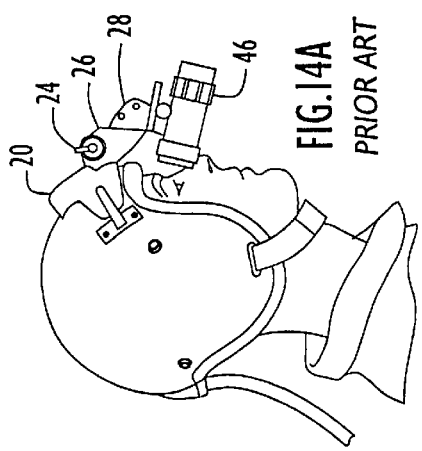
FIG.14A
*PRIOR ART*

STANDARD
PRIOR ART

IMPROVEMENT

FAR UPWARD VERTICAL ADJUSTMENT

STANDARD
PRIOR ART

IMPROVEMENT

FAR DOWNWARD VERTICAL ADJUSTMENT

STANDARD PRIOR ART

IMPROVEMENT

STANDARD PRIOR ART

FLIP-UP POSITION - SIDE PROFILE

IMPROVEMENT

FLIP-UP POSITION - FRONT PROFILE

STANDARD
PRIOR ART

IMPROVEMENT

FAR FORWARD HORIZONTAL ADJUSTMENT

STANDARD
PRIOR ART

IMPROVEMENT

FAR AFT HORIZONTAL ADJUSTMENT

STANDARD
*PRIOR ART*

IMPROVEMENT

STANDARD
*PRIOR ART*
CORRECT VIEWING - FRONT PROFILE

IMPROVEMENT

CORRECT VIEWING - SIDE PROFILE

NIGHT VISION DEVICE HELMET MOUNT

CROSS REFERENCE TO RELATED APPLICATIONS

The present application is based on and entitled to the priority of Provisional Application No. 60/347,377, filed Jan. 11, 2002.

FIELD OF THE INVENTION

The present invention is directed to an improved mount for interfacing a night vision device to a helmet.

BACKGROUND OF THE INVENTION

In the prior art, a helmet plate is part of the interface between a helmet and a night vision device. When the helmet has a smooth surface without any obstructions, a standard helmet plate is contoured to rest flush against the surface of the helmet, and is secured thereto by mechanical attachment means.

However, a certain type of helmet precludes the use of a standard mounting plate because it contains an obstruction on the surface of the helmet. An example of this type of helmet is an aviator's helmet having a large connector mounted on the front of the helmet, which serves a useful function in the daytime, but not in connection with night vision equipment.

In the prior art, for such a helmet a mounting plate is used having a cavity which encompasses the connector, so the remainder of the mounting plate may be positioned flush against the helmet surface. However, the prior art mounting plate failed to locate the night vision device in its proper position, with the result that the device was tilted downwardly, causing the aviator to have to crane his neck upwardly to achieve normal vision, and the night vision device also tended to be located too low.

SUMMARY OF THE INVENTION

It is therefore an object of the invention to provide an improved mount for interfacing a night vision device with a helmet having an obstruction.

In accordance with an aspect of the invention, the above object is achieved by providing a helmet plate comprised of a support portion having a band bearing a cavity for encompassing the helmet obstruction, and an integral power pack housing which is disposed in relation to the band and cavity at such height, depth and angular position to render a night vision device in correct viewing position when it is mounted to a mount adjustment assembly which is secured to the integral power pack housing.

In accordance with a further aspect of the invention, the integral power pack housing is located so as not to extend below about the position of the lower lip of the helmet when the helmet plate is mounted.

In accordance with a still further aspect of the invention, the mounting platform for the mount adjustment assembly, which is formed by part of the integral power pack housing, is at a slope of about 8° in relation to vertical.

Further and various other aspects of the invention will become evident in the detailed description below.

BRIEF DESCRIPTION OF DRAWINGS

The invention will be better understood by referring to the accompanying drawings wherein:

FIG. 13A shows the prior art device for a helmet having an obstruction when the tilt adjustment is at the far upward position.

FIG. 13B shows a prior art device for a standard helmet with the tilt adjustment at the far upward position.

FIG. 13C shows the improvement of the invention for a helmet having an obstruction with the tilt adjustment at the far upward position.

FIG. 14A shows the prior art device for a helmet having an obstruction with the tilt adjustment at the far downward position.

FIG. 14B shows a prior art device for a standard helmet with the tilt adjustment at the far downward position.

FIG. 14C shows the improvement of the invention for a helmet having an obstruction with the tilt adjustment at the far downward position.

DETAILED DESCRIPTION OF PREFERRED EMBODIMENTS

As previously described, the present invention relates to a helmet mount for night vision goggles which interfaces to a helmet having an obstruction. Although the invention may be used with other helmets, it is particularly applicable to a system known as the Joint Helmet Mounted Cueing System (JHMCS).

Figure 1:
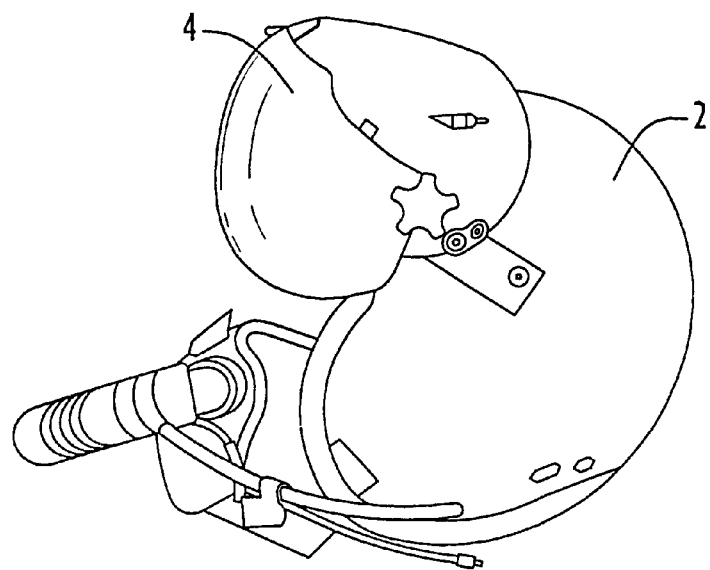
FIG. 1 shows an aviator's helmet with daytime display visor.

The JHMCS uses a modified HGU-55P aviator's helmet shown in FIG. 1 that incorporates a visor-projected Heads-Up Display (HUD) to cue weapons and sensors to the pilot. This system relies on a magnetic transmitter unit fixed to the pilot's seat and a magnetic field probe mounted on the helmet to define helmet pointing positioning. A Helmet Vehicle Interface (HVI) interacts with the aircraft system bus to provide signal generation for the helmet display. With JHMCS, the pilot can aim the radar, air-to-air missiles, infrared sensors, and air-to-ground weapons merely by pointing his/her head at the target and pressing a switch on the flight controls.

During development of the JHMCS system, a need arose to mount aviator's night vision goggles (e.g. AN/AVS-9) to the modified HGU-55/P helmet being used. The standard AN/AVS-9 helmet mount would not work due to interference with a large connector in the forward section of the helmet.

Figure 2:
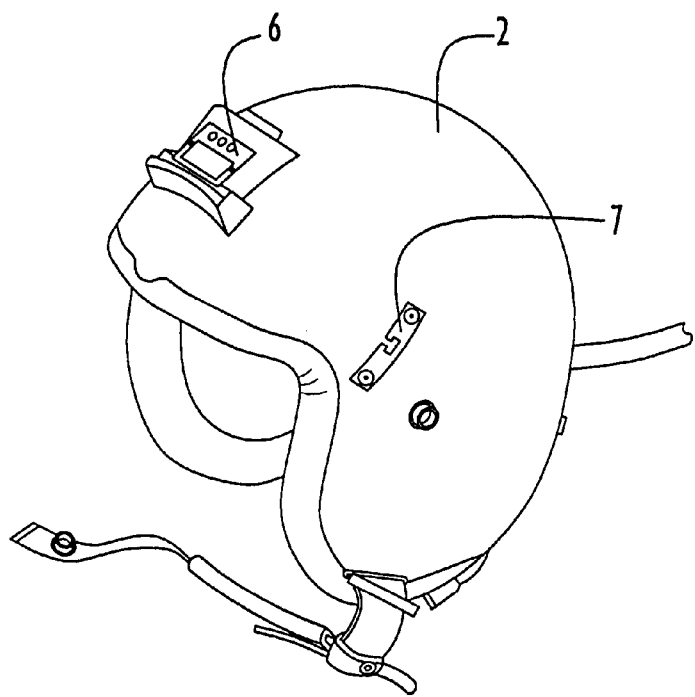
FIG. 2 shows the helmet of FIG. 1 without the daytime display visor.

Referring to FIG. 1, helmet 2 is shown with visor 4, which is mechanically secured to the helmet. The helmet without the visor is depicted in FIG. 2, and a large electrical connector 6 is revealed. The connector is used in connection with the system for the visor-projected Heads-Up Display, but serves no purpose at night when the Heads-Up Display is not used, and the visor is removed and replaced with night vision goggles. The connector 6 interferes with the standard mount which is used to interface the helmet with the night vision goggles.

Figure 3:
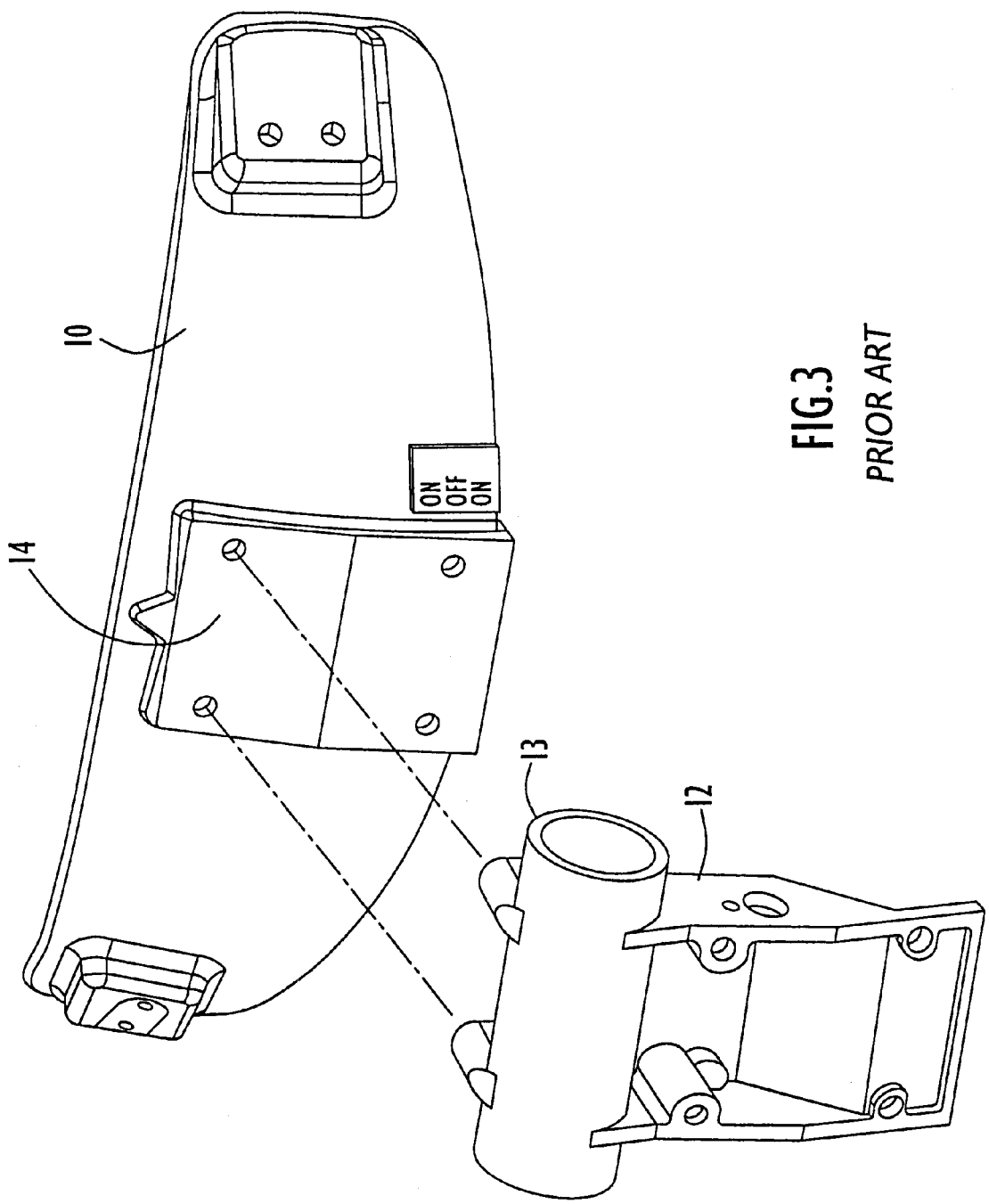
FIG. 3 shows a standard helmet plate and separable integral power pack housing of the prior art for use with a helmet not having an obstruction.

FIG. 3 depicts the standard mount, which is seen to be comprised of helmet plate 10 and separable integral power pack housing 12, which affixes to part 14 of the helmet plate with screws. The helmet plate 10 is contoured to fit flush on a helmet which does not have an obstruction such as connector 6, and this helmet plate cannot properly fit over the connector.

Figure 4:
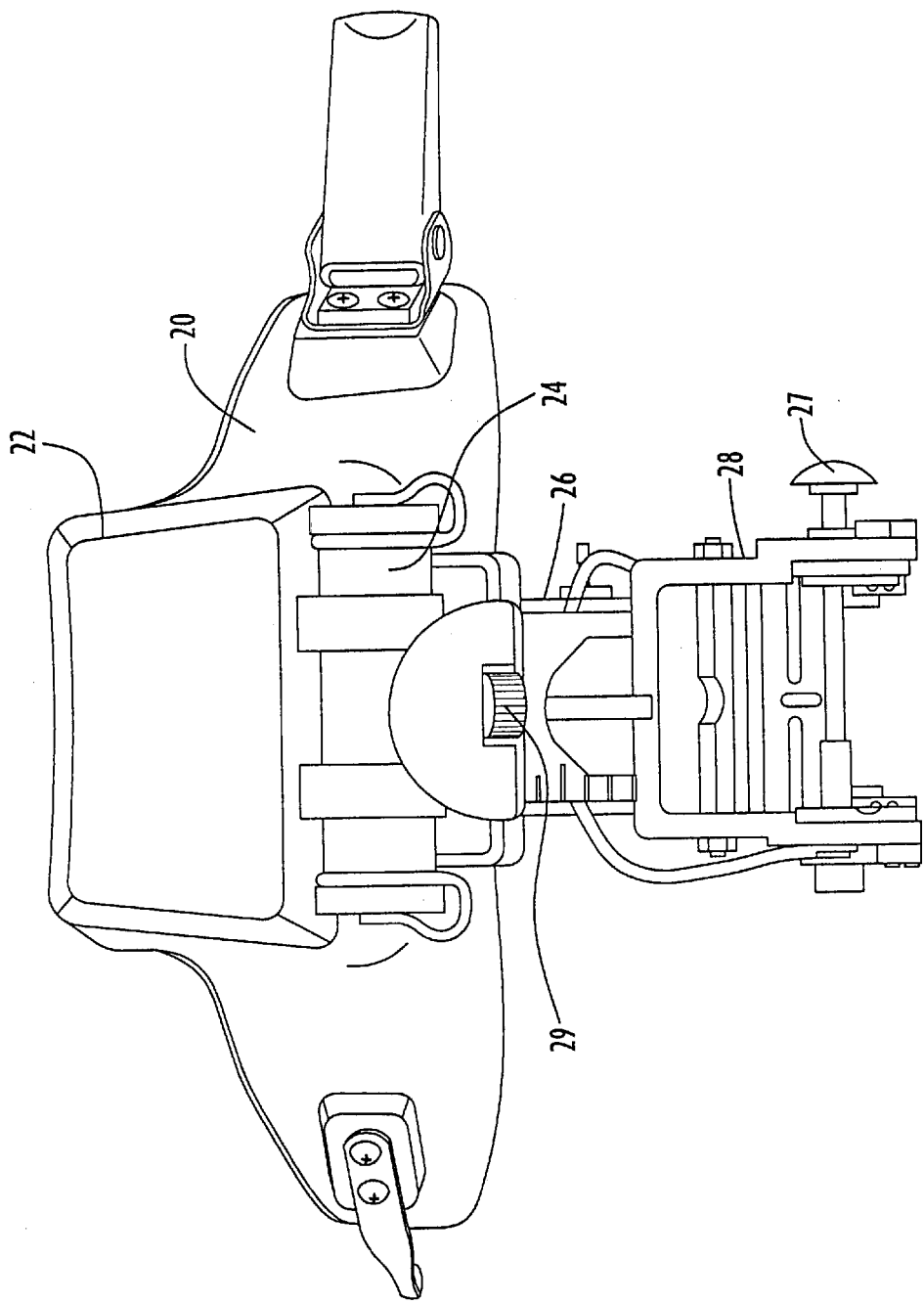
FIG. 4 shows a helmet plate and separable integral power pack housing of the prior art for use with a helmet having an obstruction.

FIG. 4 shows a prior art attempt at a solution to the problem which was produced by a competitor of the present Assignee. The mounting plate of FIG. 4 is comprised of a support portion including band 20 and cavity 22 which encompasses the connector when the helmet plate is mounted. A separable integral power pack housing is secured to the support. The integral power pack housing, as in the standard device is comprised of battery compartment receptacle 24 and electronics assembly receptacle 26. Mount adjustment assembly 28 is secured to receptacle 26 and night vision goggles (not shown) are mounted to the mount adjustment assembly.

Figure 12B:
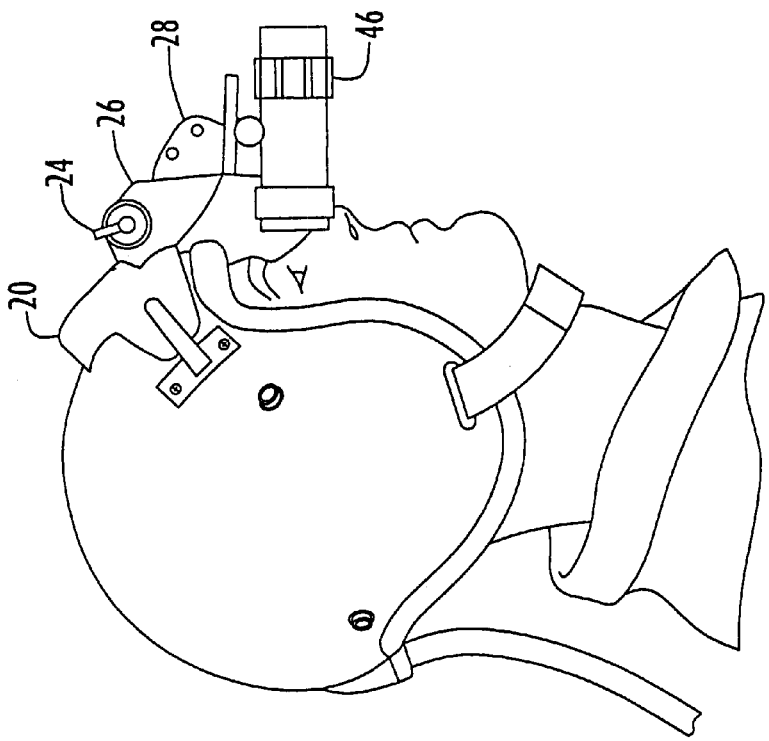
FIG. 12B shows the prior art device with the user's head titled back to bring the goggles to horizontal.
Figure 12A:
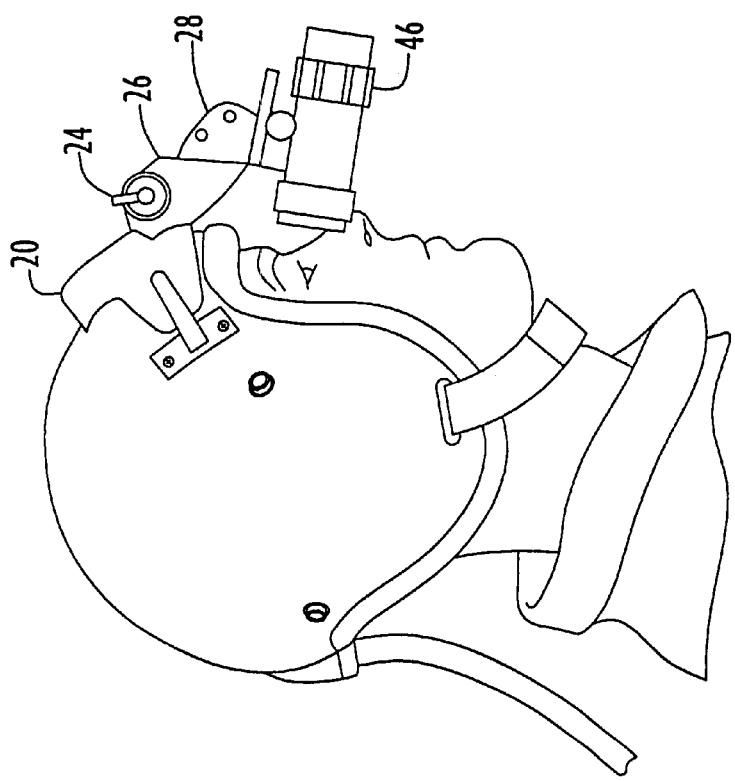
FIG. 12A shows the prior art device of FIG. 4 for a helmet having an obstruction with the user's head in the normal viewing position.

The configuration shown in FIG. 4 did not produce satisfactory results, as it failed to position the night vision goggles correctly. This is demonstrated in FIG. 12A, where it is seen that even with the tilt adjustment positioned in the far upward position, the night vision goggles still point downwardly. Referring to FIG. 12B, it is seen that it is necessary for the pilot to crane his head backwardly in order to produce a horizontal position for the goggles. This is very undesirable in view of the fact that military pilots may prefer to lean forward when flying. Other problems in the positioning of the night goggles with the prior art mounting plate are depicted in FIGS. 13 to 20, which are discussed below.

Figure 5:
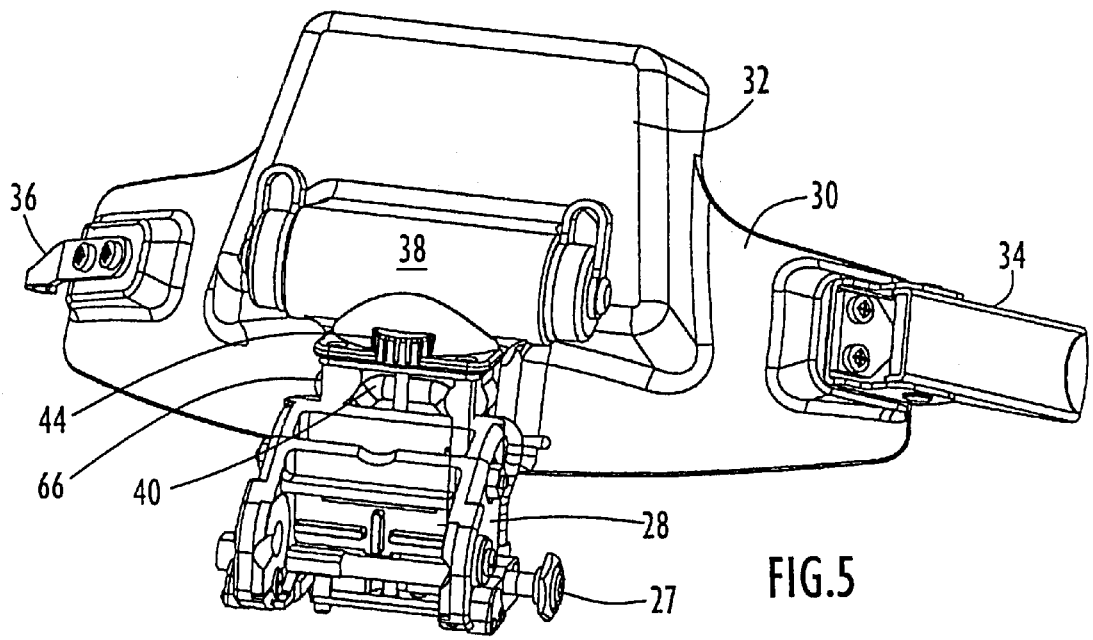
FIG. 5 shows an embodiment of the helmet mount assembly of the present invention.

FIG. 5 shows an embodiment of the improved mounting plate of the present invention. While it includes a support portion and an integral power pack housing, as are found in FIG. 4, in the device of FIG. 5 the integral power pack housing is positioned in relation to the support at such height, depth, and angular position to correctly position the night vision goggles.

Figure 6:
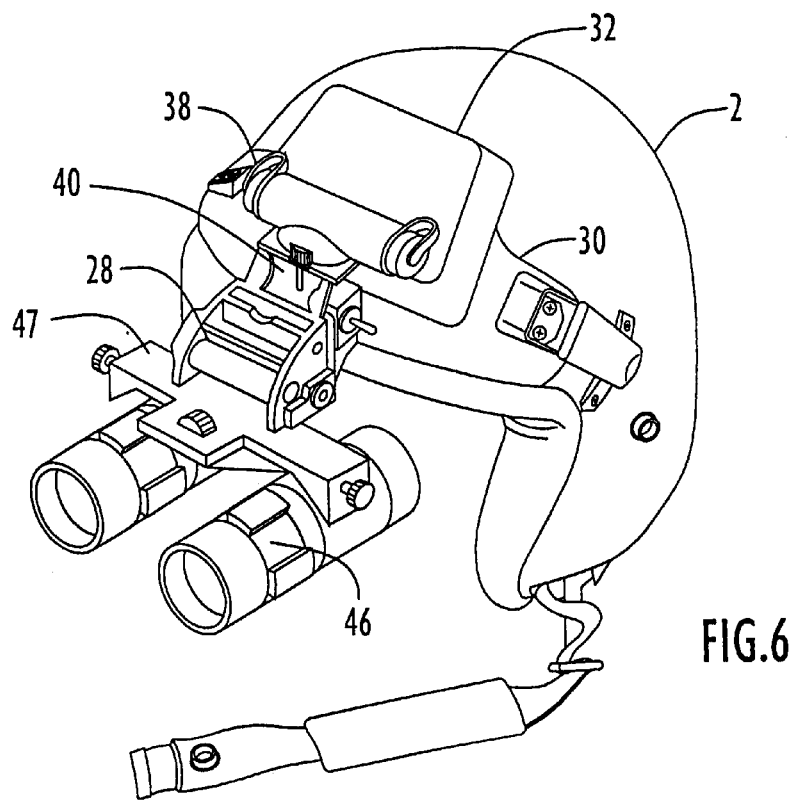
FIG. 6 shows the embodiment of FIG. 5 with night vision goggles mounted.

Referring to FIG. 5 in detail, the support portion of the mounting plate is comprised of band 30 and cavity 32. Mechanical attachment means 34 and 36, which form no part of the present invention, are provided to secure the mounting plate to an aviator's helmet. The integral power pack housing portion of the mounting plate is comprised of battery compartment receptacle 38 and electronics assembly receptacle 40. A mount adjustment assembly 28 is depicted as being secured to the front of the electronics assembly receptacle. FIG. 6 shows the mounting plate of FIG. 5 secured to a helmet 2 with night vision goggles 46 attached to the mount adjustment assembly via bridge 47.

Figure 7:
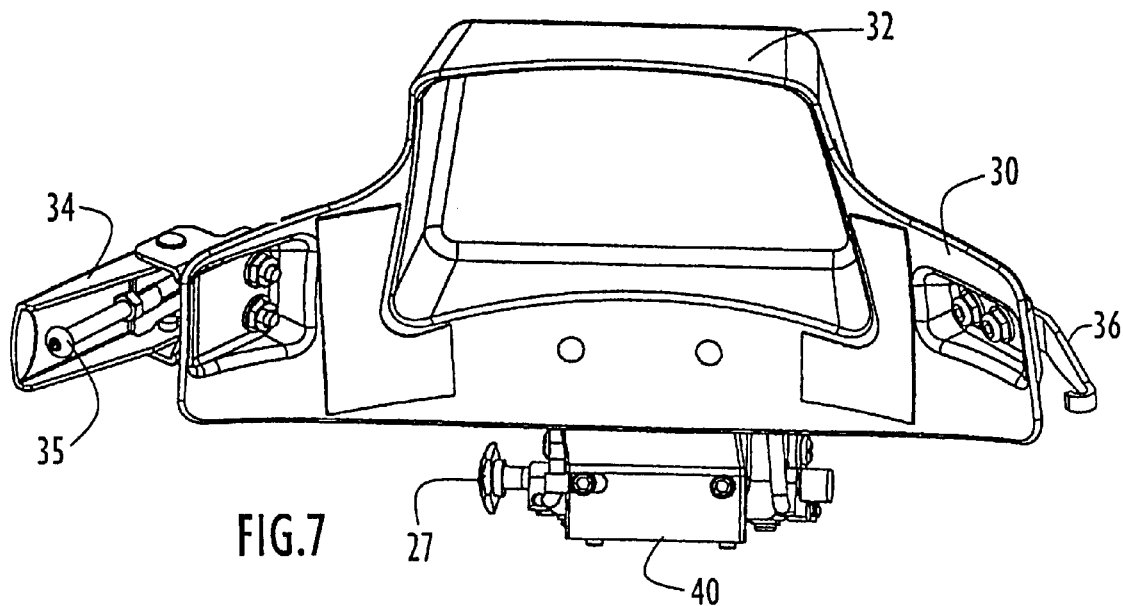
FIG. 7 shows a rear view of the embodiment of FIG. 5.

FIG. 7 is a rear view of the mounting plate and shows conventional helmet attachment members 36 and 34 in greater detail. For purpose of completeness, it is noted that attachment member 34 has a plunger 35 which inserts into a groove in member 7 (FIG. 2) when member 34 is clamped against the helmet, to securely fasten the mounting plate to the helmet. FIG. 7 also shows the interior of cavity 32 and flip-up control 27 of the mount adjustment assembly.

Figure 8:
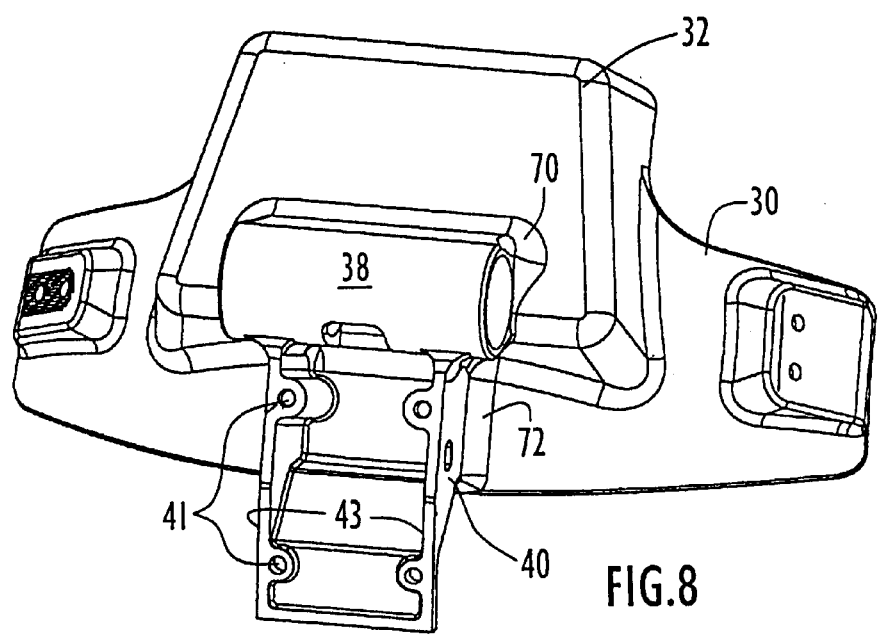
FIG. 8 shows a front view of an embodiment of the helmet plate of the invention.

FIG. 8 shows the position of the integral power pack housing 38, 40 in relation to the band 30 and cavity 32 of the mounting plate support portion. The integral power pack housing is of standard size and its leading edges contain holes 41 to which a standard mount adjustment assembly may be fastened with screws. It is the height, depth, and angular disposition of the leading edges of the integral power pack housing in relation to the support portion which determines the height, depth, and angular disposition of the mount adjustment assembly and thus also of the night vision device (which is secured to the mount adjustment assembly).

As shown in the Figures, the integral power pack housing projects from the band 30 and cavity 32 of the support portion. In the preferred embodiment, the support and integral power pack housing are of unitary construction and may be machined or molded from a single piece of plastic. Unitary construction facilitates precise control of the geometric configuration, which helps ensure that in the resulting device the night vision device is lined up correctly. Filler material 70 and 72 is included to present rounded transition surfaces between the integral power pack housing and the support. In another embodiment, the support and integral power pack housing are separate pieces, connected together with fastening means.

Figure 9:
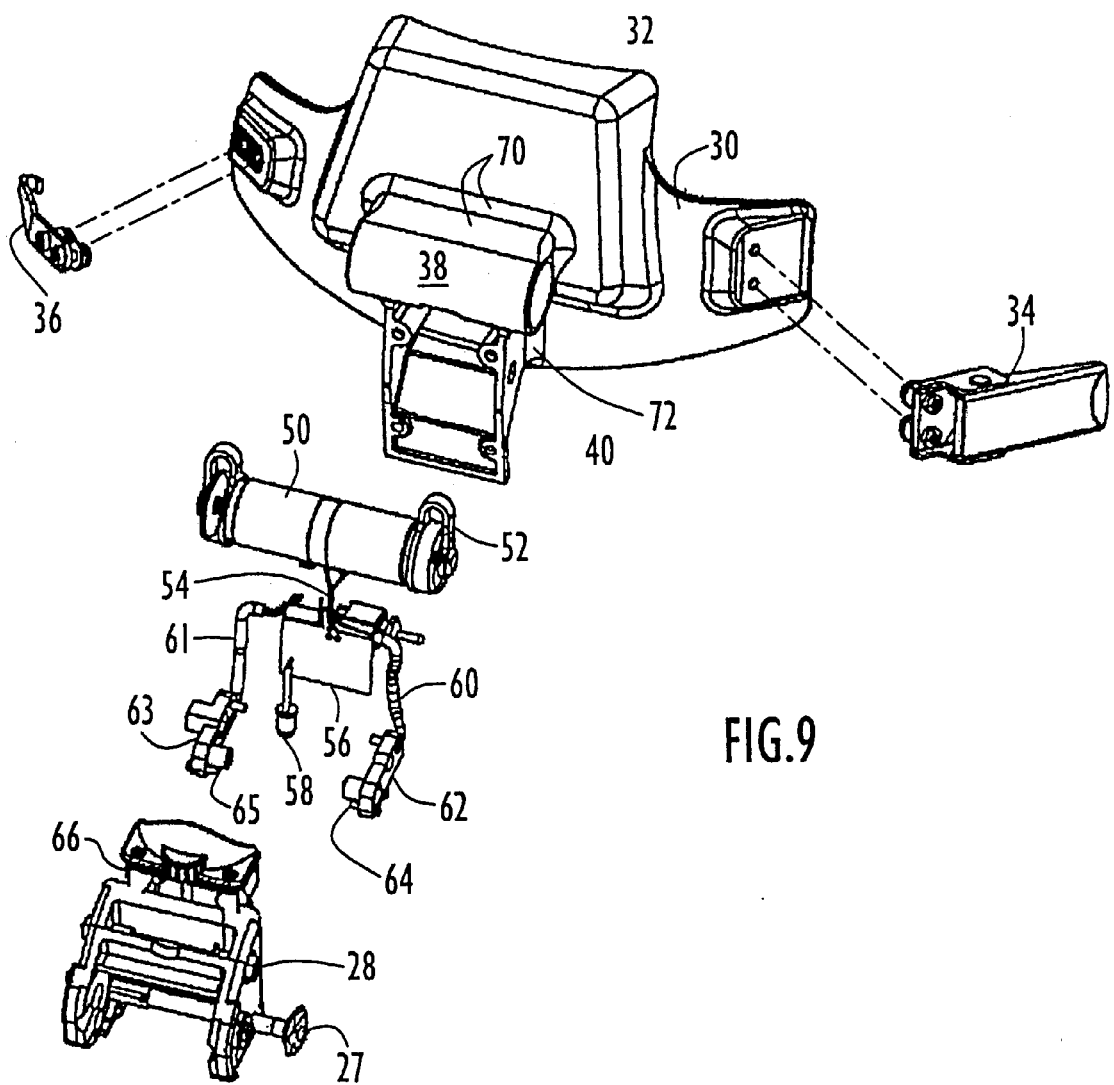
FIG. 9 shows an exploded view of the embodiment of FIG. 5.

FIG. 9 is an exploded view of the device, which shows the various components. Battery means 50 is provided, which is mounted in battery compartment receptacle 38. An electrical lead 54 is connected from the battery means to printed circuit board 56 which includes the necessary electrical functions for the night vision device. Lamp or light emitter 58 is a low battery indicator, while electrical power is fed through leads 60 and 61 to contacts 64 and 65, held by mechanical housings 62 and 63 respectively, for interfacing with inputs to the night vision device. As previously described, the mount adjustment assembly 28 is secured to the front of electronics assembly receptacle 40 with screws to complete the assembly. Mount adjustment assembly includes flip-up button 27 which when pressed flips the night vision goggles up over the helmet when their use is not desired and wheel 66, which controls the vertical position of the mount adjustment assembly, and thus of the night vision goggles to be secured thereto. A standard mount adjustment assembly is ITT Part No. 264317 and equivalent devices. The controls for tilt and fore-aft position are located within the goggle assembly, for example the tilt is controlled by changing the orientation of the goggles with respect to bridge 47 (FIG. 6), the angle of bridge 47 being controlled by the angle of the mount adjustment assembly and ultimately by the slope of the leading edge of the integral power pack housing. The goggles referred to are those, including the AN/AVS-9, which mate with the standard mount adjustment assembly, all such goggles having the same range of adjustability.

Figure 10:
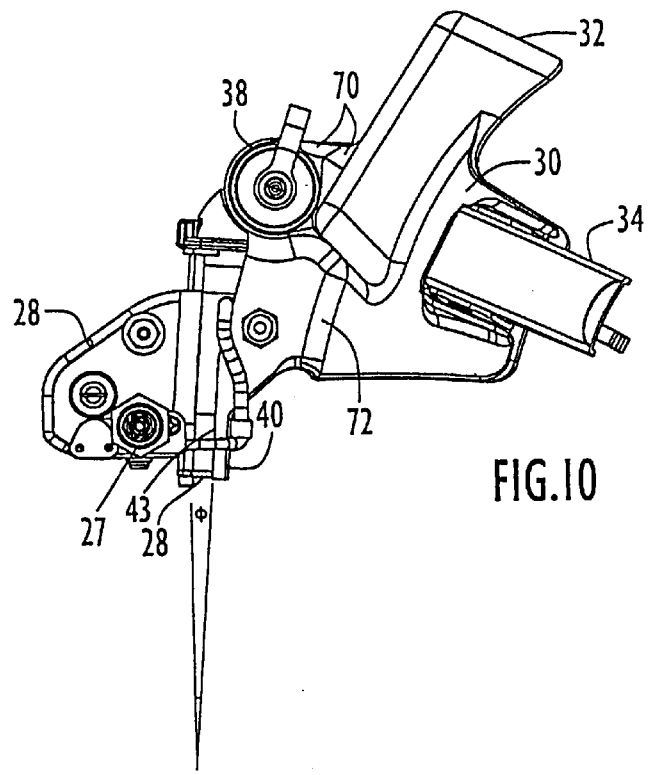
FIG. 10 shows a side view of the embodiment of FIG. 5.
Figure 11:
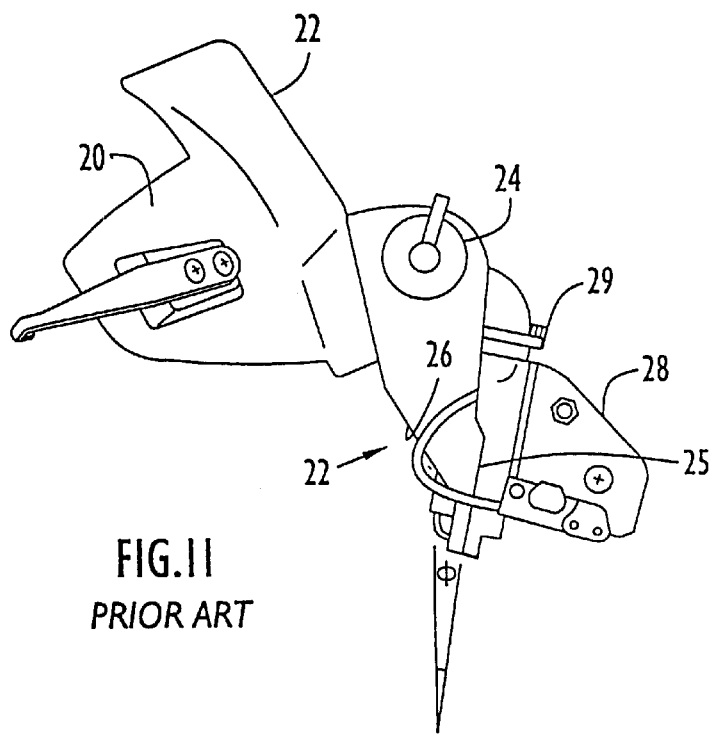
FIG. 11 shows a side view of the prior art device of FIG. 4.

FIG. 10 is a side view of the FIG. 5 embodiment of the mounting plate of the invention, and clearly shows the position of the integral power pack housing in relation to the support which results in correct positioning of the night vision goggles. On the other hand, for purposes of comparison, FIG. 11 is a side view of the prior art arrangement of FIG. 4 which does not position the night vision goggles correctly.

Referring to FIG. 10, it is the position of the leading edges 43 of the electronics assembly receptacle of the integral power pack housing which controls correct placement of the night vision goggles. The angle $\Phi$ between the slope of the leading edges and vertical controls the correct tilt position, which angle should be about 8° short of vertical. The angle $\Phi$ in FIG. 10 is to be contrasted with the prior art arrangement of FIG. 11, where the corresponding angle appears to cross vertical, resulting in the abnormal downward tilt previously described in connection with FIG. 12.

Figure 16A:
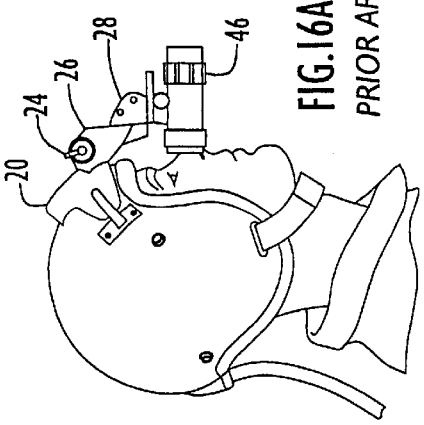
FIG. 16A shows the prior art device for a helmet having an obstruction with the vertical adjustment at the far downward position.
Figure 16B:
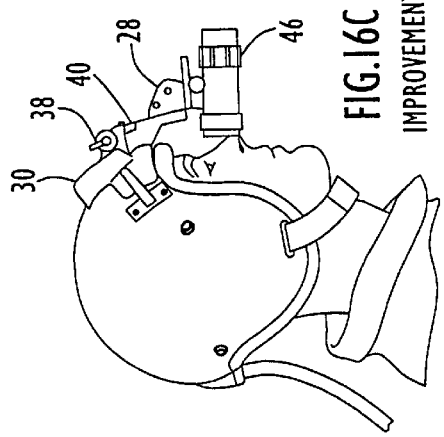
FIG. 16B shows a prior art device for a standard helmet with the vertical adjustment at the far downward position.
Figure 16C:
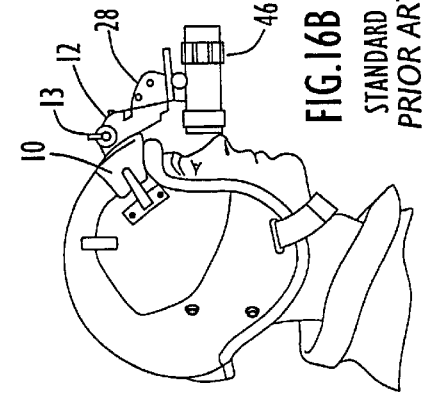
FIG. 16C shows the improvement of the invention with the vertical adjustment at the far downward position.
Figure 18A:
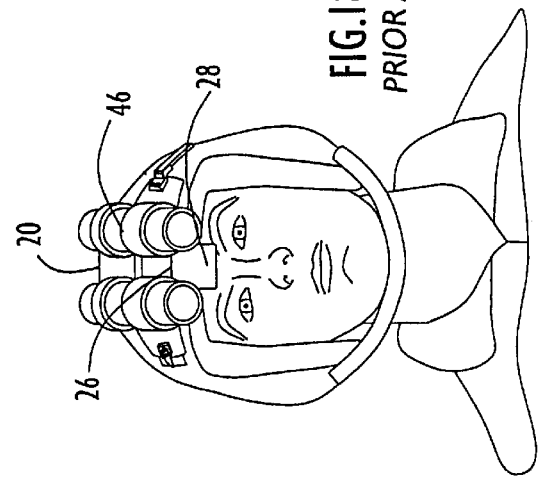
FIG. 18A shows the prior art device for a helmet having an obstruction at the flip up position as seen frontally.
Figure 18B:
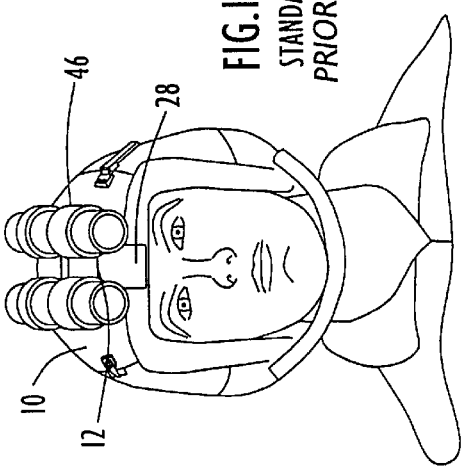
FIG. 18B shows a prior art device for a standard helmet at the flip up position as seen frontally.
Figure 18C:
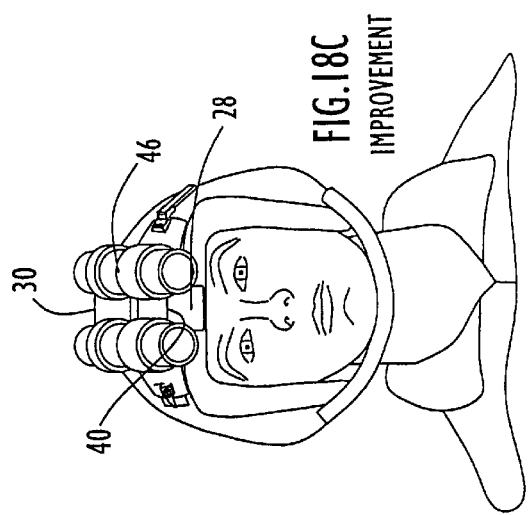
FIG. 18C shows the improvement of the invention at the flip up position as seen frontally.
Figure 19A:
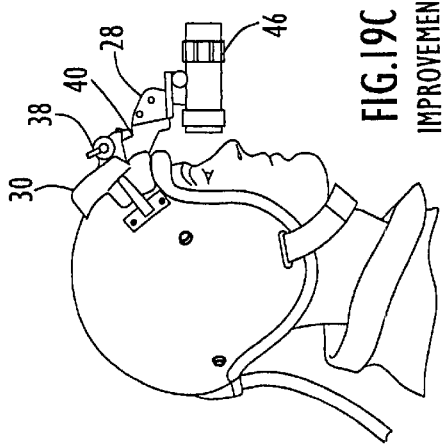
FIG. 19A shows the prior art device for a helmet having an obstruction when the horizontal adjustment is at the far forward position.

Furthermore, the integral power pack housing is situated higher on the support in FIG. 10 than in FIG. 11, so that when deployed on a standard aviator's helmet the bottom of the standard size integral power pack housing does not extend below about the position of the lower lip of the helmet (FIG. 18C). This positions the night vision goggles in the correct vertical position, and should be compared with the prior art configuration as mounted on the helmet (FIG. 18A) where the integral power pack housing extends below the lower helmet lip, resulting in a too far down position for the night vision goggles (FIG. 16A). The abnormal tilt of the prior art device of FIG. 11 also results in the night vision goggle being too close to the observer's head (FIG. 19A).

Figure 21A:
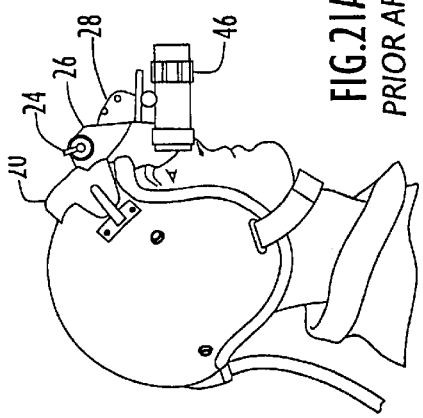
FIG. 21A shows a side profile of the prior art device for a helmet having an obstruction in correct viewing position.
Figure 21B:
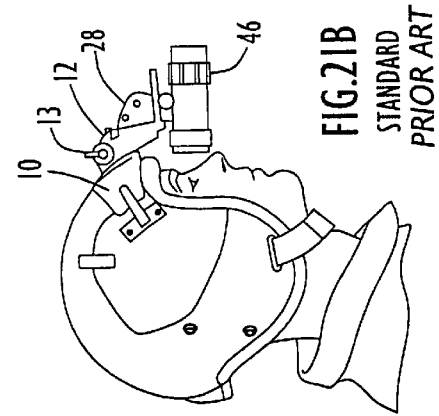
FIG. 21B shows a side profile of a prior art device for a standard helmet in correct viewing position.
Figure 21C:
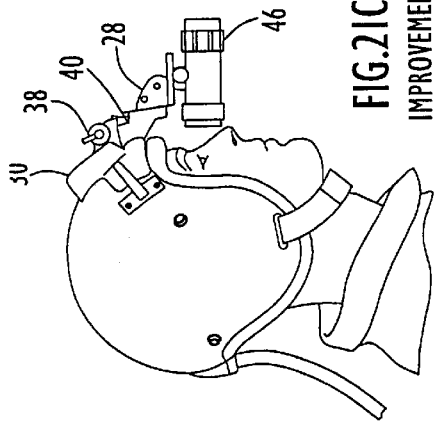
FIG. 21C shows a side profile of the improvement of the invention for a helmet having an obstruction in correct viewing position.

As previously mentioned, the arrangement of FIG. 10 is designed to put the night vision goggles in correct viewing position for a user, such as is depicted in FIG. 21C where the tilt angle is horizontal and the vertical position is at eye level. The user referred to has a nominally average size head and a neck in the upright position (generally vertical orientation), as shown in FIG. 21C. The term nominally average size head refers to head sizes within the "$5^{th}$ to $95^{th}$" percentile of potential users including eye placement and other anthrometric measurements, as known to those skilled in the art. Correct viewing position may be attained when the range of adjustments provided by the mount adjustment assembly and night vision goggles are used, and the arrangement of FIG. 10 is also preferably effective to put the night vision goggles in correct viewing position when such adjustments are in mid-range position.

FIGS. 13 to 20 pictorially illustrate a comparison of the night vision goggle positioning provided by the improvement of the invention in relation to the prior art for various mount adjustments. For the sake of completeness, the positioning provided by the standard helmet mount (no obstruction on helmet) is also depicted.

FIGS. 13A to 13C and 14A to 14C show tilt adjustment. FIGS. 13A to 13C show the position of the night vision goggles when the tilt adjustment is as far upward as possible. It is seen that in both the cases of FIG. 13B, which is directed to the standard helmet mount (no obstruction on helmet) and of FIG. 13C, directed to the improvement of the invention, there is a significant upward tilt to the night vision goggles 46. However, in the case of the prior art for the obstructed helmet, FIG. 13A, the night vision goggles are tilted downwards. Thus, in the case of FIGS. 13B and 13C the goggles are in correct position for the adjustment used, while for the prior art, as shown in FIG. 13A, there is no tilt adjustment within the range provided on a standard mounting arrangement which will result in the correct tilt position for the night vision goggles.

Similarly, referring to FIG. 14A, which shows the far downward tilt position, it is seen that the night vision goggles are angled downwardly to an inappropriate degree in the prior art of FIG. 14A, as compared with both the improvement of the invention and the standard prior art, depicted in FIGS. 14C and 14B respectively.

Figure 15A:
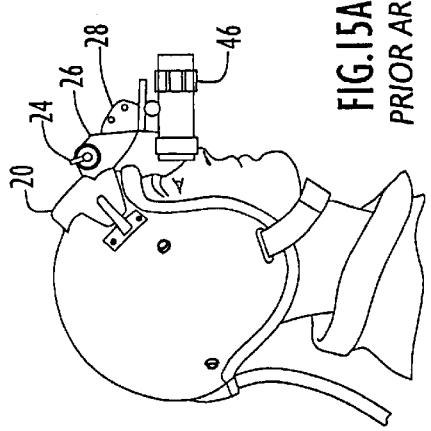
FIG. 15A shows the prior art device for a helmet having an obstruction with the vertical adjustment at the far upward position.
Figure 15B:
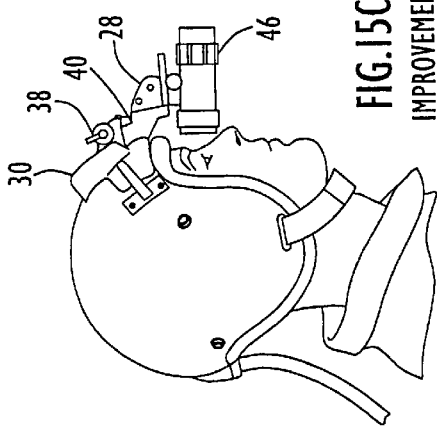
FIG. 15B shows a prior art device for a standard helmet with the vertical adjustment at the far upward position.
Figure 15C:
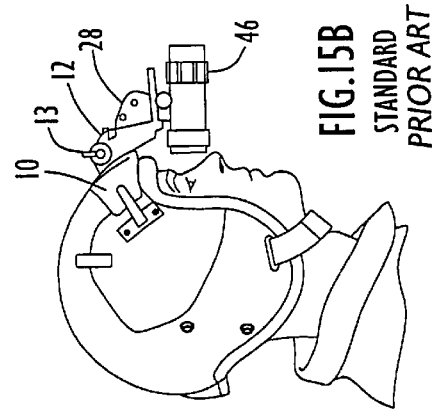
FIG. 15C shows the improvement of the invention for a helmet having an obstruction with the vertical adjustment at the far upward position.

Since it is necessary for the user of the prior art to crane his or her neck backwardly to achieve the correct tilt position (FIG. 12B), in FIGS. 15A to 20A, the user is shown with such a neck position. FIGS. 15A to 15C and 16A to 16C are directed to the vertical adjustment. It will be observed that in FIGS. 15B and 15C, representative of the standard and improvement arrangements, the goggles are somewhat above eye level corresponding to the far upward vertical position, while in FIGS. 16B and 16C the goggles are somewhat below eye level, corresponding to the far downward vertical position. On the other hand, in FIGS. 15A and 16A representative of the prior art, the goggles are at about eye level in the far upward position and far below eye level in the far downward position. Thus, the prior art positions the night vision goggles too low.

Figure 17A:
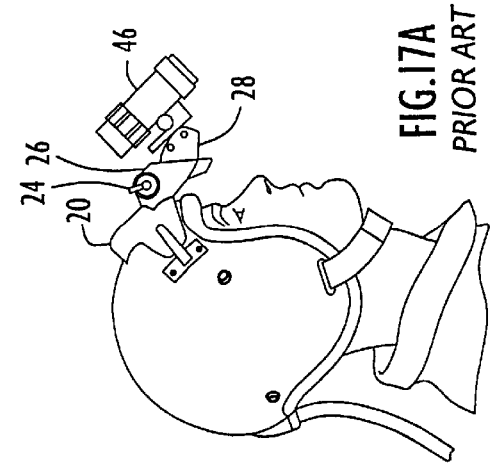
FIG. 17A shows the prior art device for a helmet having an obstruction when at the flip up position as seen at side profile.
Figure 17B:
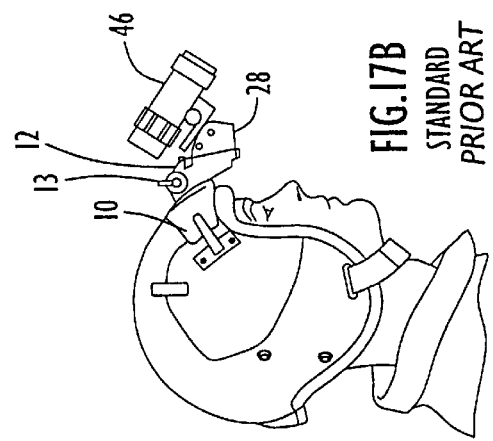
FIG. 17B shows a prior art device for a standard helmet at the flip up position as seen at side profile.
Figure 17C:
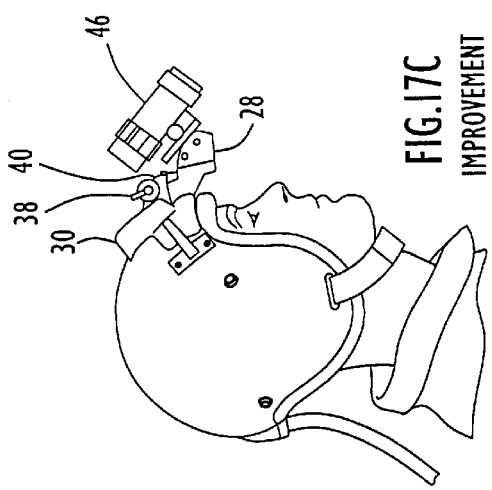
FIG. 17C shows the improvement of the invention at the flip up position as seen at side profile.

FIGS. 17A to 17C show a side profile of the respective devices in the flip-up position. The more severe downward tilt of the prior art can be seen in FIG. 17A when compared to FIGS. 17B and 17C.

FIGS. 18A to 18C show the front profile of the flip-up position for the devices. As can be clearly seen, for the prior art arrangement of FIG. 18A, the mount adjustment assembly 28 (and the bottom of the integral power pack housing to which the mount adjustment assembly is secured) extend below the lower lip of the helmet, while in the device of FIGS. 18B and 18C they do not. As discussed above, the too low location of the integral power pack housing in the prior art results in incorrect positioning of the night vision goggles.

Figure 19B:
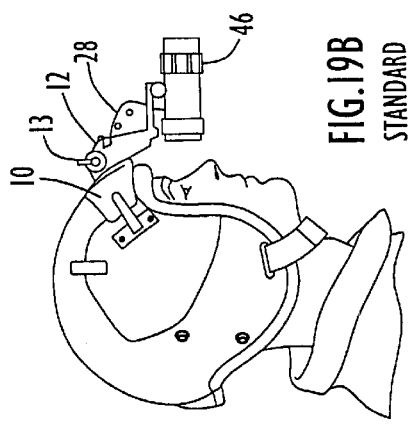
FIG. 19B shows a prior art device for a standard helmet with the horizontal adjustment at the far forward position.
Figure 19C:
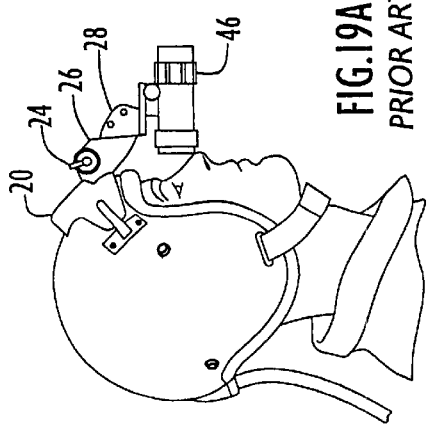
FIG. 19C shows the improvement of the invention for a helmet having a obstruction with the horizontal adjustment at the far forward position.
Figure 20A:
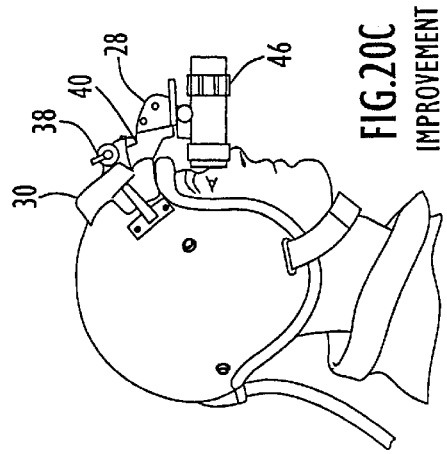
FIG. 20A shows the prior art device for a helmet having an obstruction with the horizontal adjustment at the far aft position.
Figure 20B:
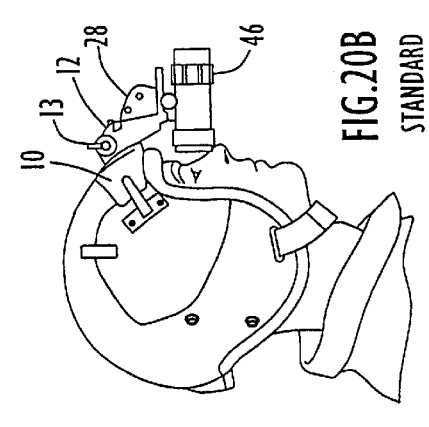
FIG. 20B shows a prior art device for a standard helmet with the horizontal adjustment at the far aft position.
Figure 20C:
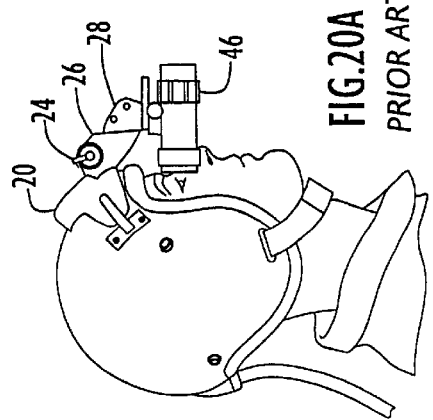
FIG. 20C shows the improvement of the invention for a helmet having an obstruction with the horizontal adjustment at the far aft position.

FIGS. 19A to 19C and FIGS. 20A to 20C show the horizontal adjustment. In FIGS. 19A to 19C, the adjustment is in the far forward position, while in FIGS. 20A to 20C to adjustment is in the far aft position. It will be observed that in the prior art arrangement of FIGS. 19A and 20A the night vision goggles are farther aft than in either the standard arrangement of FIGS. 19B and 20B or the improvement of FIGS. 19C and 20C. This is because the more clockwise tilt of the integral power pack housing and mount adjustment assembly of the prior art pulls the goggles in the aft direction.

Figure 22A:
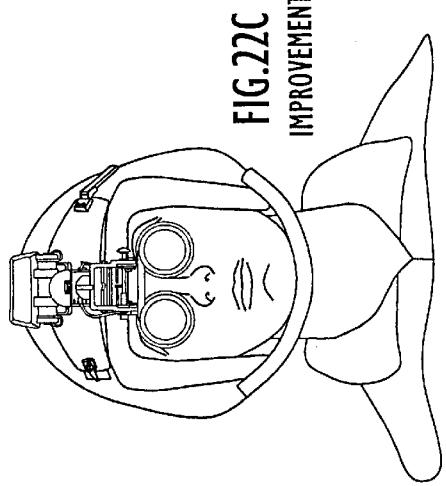
FIG. 22A shows a front profile of the prior art device for a helmet having an obstruction in correct viewing position.
Figure 22B:
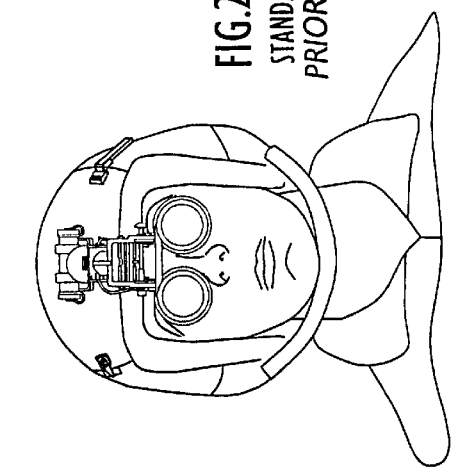
FIG. 22B shows a front profile of the prior art device for a standard helmet in correct viewing position.
Figure 22C:
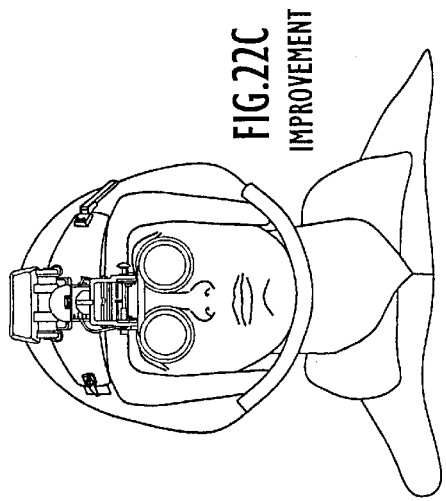
FIG. 22C shows a front profile of the improvement of the invention for a helmet having an obstruction in correct viewing position.

FIGS. 21A to 21C show a side profile of correct viewing position for three devices, while FIGS. 22A to 22C show a front profile of the same. It is noted that in the case of FIGS. 21A and 22A, correct viewing position is only achieved when the user's head is tilted backwardly. It is further noted that with the preferred embodiment of the invention, in FIGS. 21C and 22C correct viewing position is achieved when the mount adjustments are in mid-range position (FIGS. 21C, 22C).

There thus has been disclosed an improved mounting plate for interfacing between a helmet and a night vision device. It should be understood that while a preferred embodiment has been disclosed, variations may occur to those skilled in the art, and the invention to be covered is defined in the claims which are appended hereto.

I claim:

1. A helmet plate for interfacing between a helmet having a frontally located obstruction and a mount adjustment assembly for a night vision device, comprising:
   a support portion capable of being mounted to the helmet, comprised of a band bearing a cavity having an inside cavity surface for overlying the frontally located obstruction on the helmet when mounted; and
   an integral power pack housing;
   wherein the integral power pack housing is disposed in relation to the band and cavity at such height, depth and angular position to render a night vision device when mounted to a mount adjustment assembly secured to the integral power pack housing capable of being in correct viewing position for a user wearing the helmet when its position is adjusted by adjustments provided by the night vision device and mount adjustment assembly.

2. The helmet plate of claim 1 wherein the helmet has a lower lip having a bottom surface, and wherein the integral power pack housing is of standard size and is disposed in relation to the band and cavity such that it does not extend beyond about the position of the bottom surface of the lower lip when the helmet plate is mounted.

3. The helmet plate of claim 2 wherein the integral power pack housing is comprised of a battery compartment receptacle and an electronics assembly receptacle.

4. The helmet plate of claim 3 wherein the electronics assembly receptacle has forward edges which comprise a mounting platform for the mount adjustment assembly, and wherein at least near the end of a portion of such forward edges of the electronics assembly receptacle farthest from the battery compartment receptacle, such edges are disposed at a slope of angle $\Phi$ of about 8° short of vertical when the helmet plate is mounted to a helmet being worn by a user whose neck is an upright or generally vertical orientation.

5. The helmet plate of claim 1 wherein the support portion and the integral power pack housing are of unitary construction.

6. The helmet plate of claim 4 wherein the support portion and the integral power pack housing are of unitary construction.

7. The helmet plate of claim 5 in combination with a mount adjustment assembly which is secured to the integral power pack housing.

8. The helmet plate of claim 5 in combination with both a mount adjustment assembly which is secured to the integral power pack housing and a night vision goggle device which is secured to the mount adjustment assembly.

9. The helmet plate of claim 5 wherein the obstruction on the helmet is a connector.

10. The helmet plate of claim 1 wherein the night vision device when mounted to a standard mount adjustment assembly is rendered such that it is in correct viewing position for a user wearing the helmet when the adjustments provided by the night vision device and mount adjustment assembly are in mid-range position.

11. A helmet plate for interfacing between a helmet having a frontally located obstruction and a mount adjustment assembly for a night vision device, comprising:
   support means capable of being mounted to the helmet for overlying the frontally located obstruction on the helmet when mounted; and
   integral power pack housing means extending from the support means for holding a mount adjustment assembly at such position that when a night vision device is mounted in the mount adjustment assembly it is in correct viewing position for a user wearing the helmet when adjustments provided by the night vision device and mount adjustment assembly are in mid-range position.

12. A night vision apparatus for attachment to a helmet having a frontally located obstruction comprising:
   a helmet plate capable of being secured to the helmet;
   a standard mount adjustment assembly capable of being secured to the helmet plate; and
   a night vision device capable of being secured to the mount adjustment assembly;
   wherein the helmet plate is comprised of:
      a support portion including a fastening means for attachment to the helmet, comprised of a band bearing a cavity for overlying the frontally located obstruction on the helmet when mounted and an integral power pack housing;

wherein the integral power pack housing is disposed in relation to the support portion at such height, depth, and angular disposition to render the night vision device when the mount adjustment assembly is secured to the helmet plate and the night vision device is secured to the mount adjustment assembly, in correct viewing position for a user wearing the helmet when adjustments provided by the night vision device and mount adjustment assembly are in mid-range position.

13. A helmet plate for interfacing between a helmet having a frontally located obstruction and a mount adjustment assembly for a night vision device, comprising:

a support portion capable of being mounted to the helmet, comprised of a band bearing a cavity having an inside cavity surface for overlying the frontally located obstruction on the helmet when mounted; and an integral power pack housing comprised of a battery compartment receptacle and an electronics assembly receptacle wherein the electronics assembly receptacle has forward edges which comprise a mounting platform for the mount adjustment assembly, and wherein at least a portion of such forward edges near the end of the electronics assembly receptacle farthest from the battery compartment receptacle are disposed at a slope of angle $\Phi$ of about 8° short of vertical when the helmet plate is mounted on a helmet being worn by a user whose neck is in an upright or generally vertical orientation.

14. The helmet plate of claim 13 wherein the helmet has a lower lip having a bottom surface, and wherein the integral power pack housing is of standard size and is disposed in relation to the band and cavity such that it does not extend beyond about the position of the bottom surface of the lower lip when the helmet plate is mounted.

15. The helmet plate of claim 14 wherein the support portion and the integral power pack housing are of unitary construction.

16. The helmet plate of claim 15 wherein the disposition of the integral power pack housing in relation to the support portion renders a night vision device when mounted to a mount adjustment assembly secured to the integral power pack housing in correct viewing position.

17. A helmet plate for interfacing between a helmet having a frontally located obstruction and a mount adjustment assembly for a night vision device, comprising:

a support portion capable of being mounted to the helmet, comprised of a band bearing a cavity having an inside cavity surface for overlying the frontally located obstruction on the helmet when mounted; and an integral power pack housing comprised of a battery compartment receptacle and an electronics assembly receptacle, wherein the helmet has a lower lip having a bottom surface, and wherein the integral power pack housing is of standard size and is disposed in relation to the band and cavity such that it does not extend beyond about the position of the bottom surface of the lower lip when the helmet plate is mounted.

18. The helmet plate of claim 17 wherein the obstruction on the helmet is a connector.

* * * * *